Sept. 24, 1968  P. FIEBELMANN  3,403,075
NUCLEAR REACTOR
Filed Aug. 11, 1966  8 Sheets-Sheet 1
FIG.1
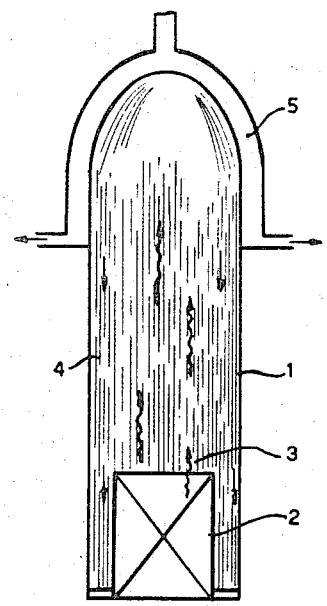
FIG.9
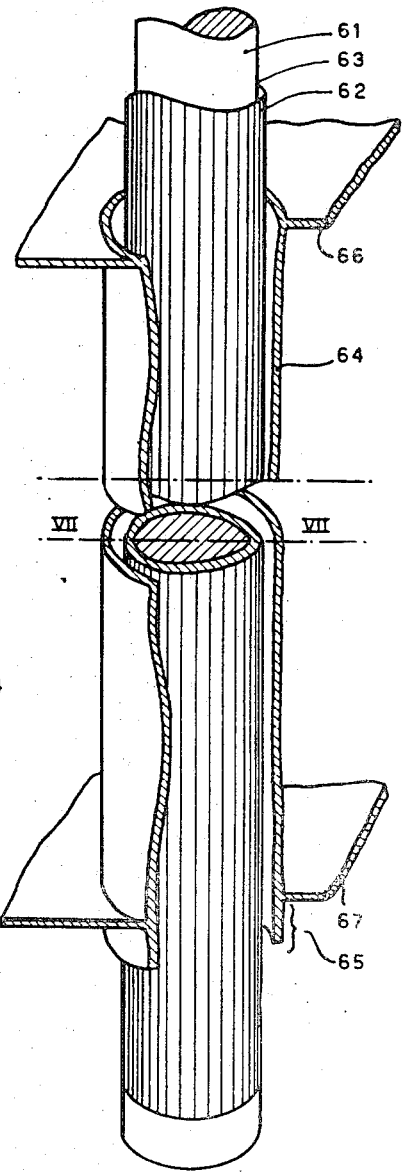
FIG.8

Sept. 24, 1968     P. FIEBELMANN     3,403,075
NUCLEAR REACTOR
Filed Aug. 11, 1966     8 Sheets-Sheet 3
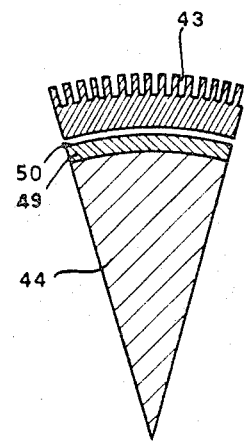
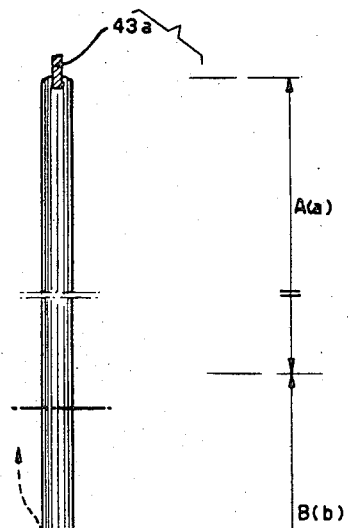
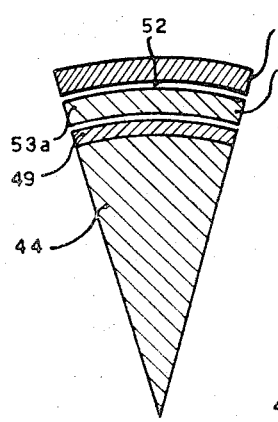
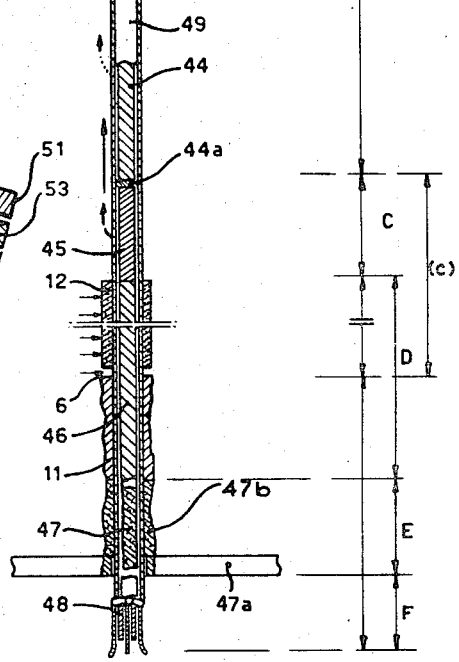

Sept. 24, 1968

P. FIEBELMANN 3,403,075

NUCLEAR REACTOR

Filed Aug. 11, 1966

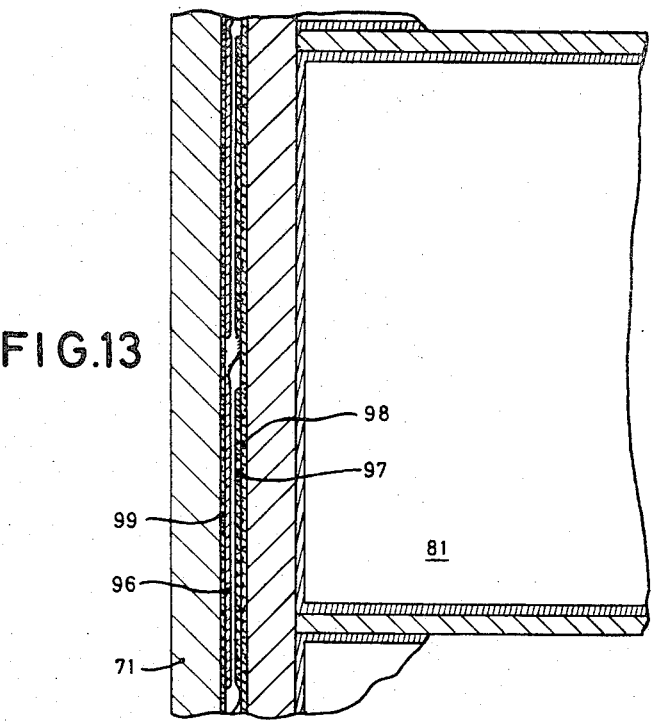
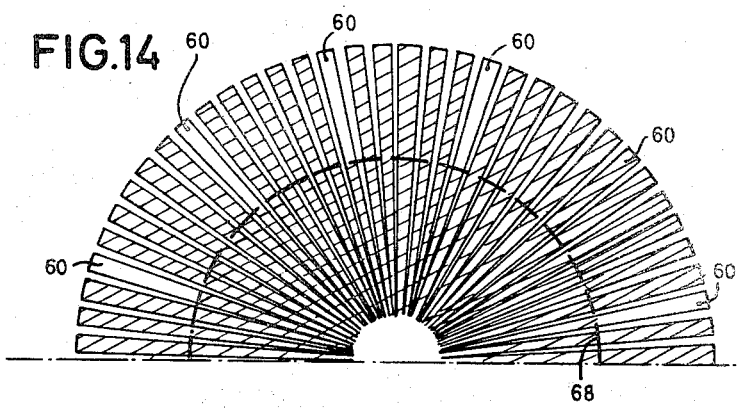

United States Patent Office 3,403,075
Patented Sept. 24, 1968

3,403,075
NUCLEAR REACTOR
Peter Fiebelmann, Besozzo, Varese, Italy, assignor to European Atomic Energy Community (Euratom), Brussels, Belgium
Filed Aug. 11, 1966, Ser. No. 571,857
Claims priority, application Germany, Aug. 23, 1965, E 29,944; Sept. 20, 1965, E 30,136
8 Claims. (Cl. 176—57)

ABSTRACT OF THE DISCLOSURE

A nuclear reactor having evaporization cooling and in which a reactor core is mounted in the bottom of a substantially vertical gas and pressure tight vessel. The vessel has a substantially cylindrical lower end and a cupola-shaped upper end. Means are provided to cool the cupola-shaped upper end from outside of the vessel. The inner surface of the vessel is provided with a capillary structure. Adjacent the reactor core a coolant medium is evaporated to again condense at the cupola-shaped upper end and returns, via capillary action, to the core.

---

It is common practice for the heat generated in a nuclear reactor (e.g. a heterogenous reactor) to be dissipated by means of a thermal carrier medium passed through the reactor and generally for the heat to be transferred in a heat exchanger to another medium for further utilization. The cooled thermal transfer medium is subsequently returned to the reactor and once again passed through the reactor core. The thermal transfer medium is circulated by pumps.

In order to eliminate the use of power-consuming pumps in nuclear reactors it has already been proposed to employ heat pipes for reactors for space vehicles, the method of operation of such heat pipes having been described on pages 1990/91 of the "Journal of Applied Physics" of June 1964. According to the aforementioned proposal the components of the reactor core, that is to say in particular the fuel elements but where applicable the moderator and reflector elements, are to be equipped with heat pipes or be constructed as heat pipes so that the heat generated in the reactor is freely radiated into space by the pipes.

It has also been proposed that the heat pipes be heated centrally from the interior, for example by nuclear fuel and not externally as heretofore. The present invention is based on the idea that the principle of the centrally heated heat pipe with capillary structure be applied to an entire reactor. On the one hand this has the advantage of pumpless operation and on the other hand nothing is changed in the basic structure of the components of the reactor core. According to the invention the reactor vessel is therefore constructed and operated as a heat pipe and the reactor core is constructed and operated as the evaporator of a thermal transfer medium which is introduced into the vessel. This results in a single, large heat pipe which represents both the vapor collecting space and the condenser and in which the reactor core continuously evaporates the returning condensate.

This concept is particularly suitable for enriched, fast reactors and high-speed breeder reactors with liquid metal cooling, particularly for reactors in space vehicles, the reactor vessel in all cases having to have the necessary capillaries for conveying the condensate.

In a reactor constructed as a large-space heat pipe the reactor vessel is preferably enclosed on all sides and provided on the interior wall either wholly or partially with capillaries which extend downwards from above, the reactor vessel being connected directly as a heat exchanger.

The nuclear fuel elements and, where applicable, the moderator and reflector elements of the reactor core, may also be provided either wholly or partially on their exterior with capillaries which extend downwards from above. The elements may be assembled in the conventional rod grid in the lower part of the reactor vessel to form the reactor core but with provision for vapor exit gaps.

The lower ends of all core components may be in capillary connection with the condensate return flow structure or they may be immersed in condensate, provided at a certain level at the bottom of the reactor vessel. The thermal transfer medium or cooling medium may take the form of a substance which boils at a high temperature but low pressure, for example lithium.

In one form of the invention the reactor vessel is constructed as a cylindrical container whose end walls are formed from hemispherical shells. The capillaries may either be worked into the internal wall surface in the form of grooves or they may be formed by a capillary lining which covers the internal wall of the vessel. In each case the capillaries or the capillary space should extend vertically downwards, beginning at the apex of the upper half shell and terminating in the apex of the lower half shell.

The reactor core and its elements may be accommodated in the reactor vessel in direct contact with the thermal transfer liquid. However, in this case locks must be provided in the vessel for loading and unloading. An embodiment in which hollow inversions of the vessel floor are provided for all elements of the reactor core is to be preferred, the totality of the aforementioned inversions representing a complete reactor core including the moderator and reflector part and into which the elements concerned are fitted in the form of inserts. Tubular thimble-shaped pockets or compartments, whose openings are disposed in the floor of the vessel and whose number, position and shape corresponds to the components of the reactor core may therefore project from the floor of the reactor vessel. The pockets accommodate the nuclear fuel elements and, where applicable, the moderator and reflector elements as well as the regulating and monitoring elements of the reactor and are suitably closed by detachable plugs. By contrast with the first-mentioned version in which the sheaths of the reactor components themselves are provided with the capillaries, the sheaths of the components of this embodiment may be constructed with smooth surfaces while the external walls of the pockets are provided with the capillaries. The unavoidable gap between the sheath of the reactor core components and the internal wall of the pockets is filled with helium to provide a better thermal coupling.

The features of the invention and specific examples of reactors according thereto are described hereinafter with reference to the drawings in which:

FIGURE 1 shows the circuit of the new reactor concept,

FIGURE 2 is a vertical section through an embodiment of the reactor according to FIGURE 1 for terrestial operation, FIGURE 3 is a charged nuclear fuel pipe (capillary pipe) shown partially in section and partially as an external view, FIGURE 4 is a horizontal circular-sector section of that part through the capillary pipe according to FIGURE 3 which passes along the line IV—IV, FIGURE 5 shows a variation of FIGURE 4, FIGURE 6 is a horizontal section through a sector of the reactor core, along the line VI—VI of FIGURE 2, FIGURE 7 shows a variation of FIGURE 6, FIGURE 8 shows the reflector and control rod cooling in FIGURE 7, FIGURE 9 is a horizontal section of a circular sector of that section through the reflector and control rod cooling system according to FIGURE 8 which passes along the line VII—VII.

FIGURE 13 shows the disposition of the thermionic converter on the reactor vessel in accordance with field IX in FIGURE 10, and FIGURE 14 shows a variation of FIGURE 12 in which rods are provided that extend into the reactor core.

Figure 2:
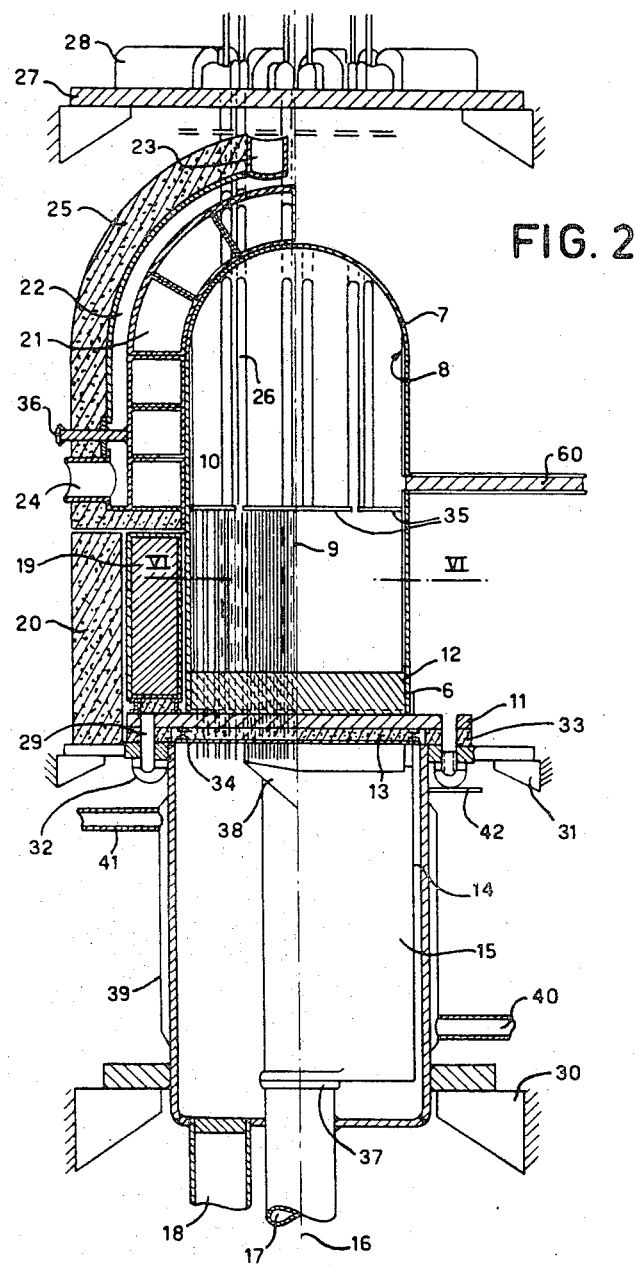

According to the schematic circuit of FIGURE 1 the reactor vessel 1 is constructed and operated as a heat pipe and the reactor core 2 is constructed and operated as evaporator of the thermal transfer medium 3 which is introduced into the vessel. The heat pipe characteristics of the reactor vessel are due to the imperforate construction of the vessel and capillary grooves 4 disposed on the internal wall and to the utilization of the lower part of the vessel as evaporator zone as well as to the utilization of the upper part of the vessel as condensation zone. The reactor core 2 is disposed in the evaporator zone while a cooler 5 is disposed at the condensation zone. A two-phase circulating flow, in which the thermal transfer medium rises in vapor form from the reactor core to the condensation zone and the condensate flows back down the vessel walls to the reactor core, is developed in the vessel; see also the arrows in the vessel.

One design of a fast reactor with breeder shell based on the circuit principle explained above is shown in greater detail in FIGURE 2. In this figure the numeral 7 refers to the reactor vessel, the numeral 8 to the capillary lining on the internal wall of the vessel, the numeral 9 refers to the retaining pipes for the elements of the fission zone, the numeral 10 to the retaining pipes for elements of the breeder or internal reflector zone, the numeral 11 to the bottom plate of the reactor vessel, the numeral 12 to a capillary structure insert at the bottom of the reactor vessel, the numeral 6 to a collector and distributor gap between 11 and 12, the numeral 13 to thermal shielding below the bottom plate, the numeral 14 to a chamber for receiving the charging machine 15 which takes the form of a cylindrical vessel, constructed to be eccentrically rotatable about the axis of symmetry 16, the numerals 17, 18 to entry and exit locks of the charging machine chamber and of the charging machine, the numeral 19 to the lateral reflector shell of the reactor, the numeral 20 to the lateral thermal shielding of the reactor core, the numeral 21 to a multiplicity of thermal transfer chambers disposed in ring form around the upper part of the reactor vessel, the numeral 22 to a cooling gap for dissipating or utilizing the condensation heat, the numerals 23, 24 to entry and exit sockets of the cooling gap, the numeral 25 to the thermal shielding of the upper part of the reactor vessel, the numeral 26 to pipes for receiving the control rods, the numeral 27 to a gantry for installing the control rod drive motors 28 and their reduction gearboxes, the numeral 29 to bolts for the connection of the reactor vessel and charging chamber by means of a flange connection, the numeral 60 to pressure-tight welded sockets for the possible pressure correction in the reactor vessel and the numerals 30, 31 to the bearers and supports of the entire reactor unit.

To simplify the illustration the thermal transfer chambers and the adjacent structures are shown on the upper part of the vessel only for one side. Furthermore, the reactor unit is enclosed by a second vessel and this vessel is followed by the biological shielding, neither of which is shown.

The reactor under consideration is intended for terrestial operation (i.e. in the gravitational field). The extent of the plant can be gauged from the following data summary of the reactor which is designed for a thermal rating of 2 mw.

| | |
|---|---|
| Height of vessel | Approximately 130 cm. |
| Diameter of vessel | Approximately 64 cm. |
| Overall height (vessel and charging chamber) | Approximately 300 cm. |
| Number of fuel elements | 318. |
| Number of breeder elements | 204. |
| Number of control rods | 12. |
| Type of nuclear fuel | UC highly enriched with $U_{235}$ (or UC-ZrC, highly enriched). |
| Nuclear fuel loading of the reactor | 135 kg. |
| Ratio of nuclear fuel volume to reactor core volume | Approximately 45%. |
| Breeder material | $UO_2$ non-enriched. |
| Diameter of the nuclear fuel zone | Approximately 31 cm. |
| Vessel operating pressure | 200 kg./cm.$^2$. |
| Thermal rating on the surface of the pipes for receiving the nuclear fuel elements | Approximately 46 w./cm.$^2$. |
| Temperature in the interior of the fuel elements | 1300° C. |
| Temperature on the surface of the receiver tubes (or vapor temperature) | Approximately 1156° C. |
| Thermal transfer medium | Lithium. |

The reactor vessel 7 consists of Nb 1 Zr (niobium alloy with 1% of zirconium). The material Waspaloy may also be employed but in this case the internal wall must be provided with a layer of Nb 1 Zr as protection against corrosion. If Nb 1 Zr is used as wall material, the external wall is appropriately provided with a Hastalloy-X cladding.

The composition of Waspaloy is in percent by weight: C, 0.06–0.1%; Mn, 0.5%; Si, 0.75%; B, 0.003–0.01%; Zr, 0.8–0.15%; Cr, 18–21%; Co, 12–15%; Mo, 3.5–5%; Ti, 2.5–3%; Al 1.2–1.5%; Fe, 2%; Cu, 0.1%; and the rest nickel (Ni).

The composition of Hastelloy–X is in percent by weight: C, 0.05–0.15%; Mn, 1%; Si, 1%; Cr, 20.5–23%; Co, 0.5–2.5%; Mo 8–10%; W, 0.2–1%; Fe, 17–20%; B, 0.005%; and the rest nickel (Ni).

The cooling gap is subdivided into three sectors by three separating walls which extend vertically and radially outward along the curvature of the vessel, the said sectors having their own entry and exit sockets 23, 24. The bolts 29 of the flange connection between the charging chamber and the reactor vessel are welded to the bottom plate and are rendered gas-tight by caps 32. A thermal insulation 33 is inserted between the flange collars.

Some special features of the reactor fittings are described in detail hereinafter.

The capillary insert 12 at the floor of the reactor vessel and the aforementioned bottom plate 11 and finally the insulating layer 13 disposed below the aforementioned bottom plate are provided with a plurality of perforations. The number and location of the perforations corresponds to the number and location of the fuel, breeder and control elements. The receiver pipes of the aforementioned elements—referred to as capillary pipes hereinafter—are inserted into the holes. Part of the underside of the capillary pipes project from the metal end plate 34 of the vessel, the remaining parts of the pipe being welded to the bottom plate 11 with a gas-tight weld. As can be seen, the capillary pipes of the core are constructed as thimble-shaped pipes whose upper ends are joined by struts 35 which act as spacer members. The pipes for receiving the control rods, which may also be operated as shutdown rods, project through the upper section of the reactor vessel as well as through the thermal transfer chambers and extend to the drive stations. The receiver pipes for the control rods are also provided with capillaries as already mentioned. The control rod pipes and the capillary pipes consist of Nb 1 Zr.

Each of the thermal transfer chambers of FIGURE 2 represents a heat pipe. Accordingly, they are constructed with a capillary structure and are provided with a quantity of the thermal transfer medium. It is their function to reduce the thermal loading of the reactor vessel wall (approximately 130 w./cm.$^2$) by low-loss means to more easily utilized values (for example 50–70 w./cm.$^2$). Each chamber is provided with a socket, see socket 36, by means of which the chamber operating pressure, which is chosen to be an optimum for the appropriate thermal loading, can be adjusted under steady-state conditions. This feature also enables the condensation in the reactor vessel, in particular the position of the condensation zone, to be determined.

In practice, only gases, such as nitrogen, can be employed to utilize the heat in the cooling gap 22 at the working temperatures (approximately 1,000° C.). The gap could also be employed for carrying out chemical reactions so that the reactor attains the characteristics of a chemical reactor. The capillary insert 12 at the bottom of the reactor vessel consists of tungsten having a porosity of more than 50%. The said capillary insert may consist of an assembly of radially or vertically stacked, thin, finned wires of 0.3–0.5 mm. diameter. As regards the internal wall of the reactor vessel, it should be noted that capillaries are basically not required for operating the reactor in a gravitational field. The vessel wall could therefore be constructed in smooth form. However, the capillaries offer two important advantages, even in this case; firstly, capillary condensation is possible, secondly, the condensate is returned uniformly and practically without droplets. By contrast, it will be necessary for applications in space, to provide a capillary covering of the kind mentioned heretofore or a structure with grooves worked directly into the wall.

The loading machine of the reactor is rotatably disposed on the shoulder bearing 37 and can be interlocked with the upper chamber wall for the appropriate loading position by means of the three arms 38. The external wall of the loading machine chamber is surrounded by a cooling jacket 39 through which cooling water flows via the inlet and exit pipes 40, 41. The chamber is also connected with a line 42 for the supply of helium. The helium gas fills not only the loading machine chamber but also the capillary, fuel, breeder and control elements.

One capillary pipe of the fuel element core and a variation will be described in detail, with reference to FIGURES 3 to 5.

According to FIGURE 3, the individual capillary pipe is constructed as a cylindrical thimble-shaped pipe, closed at the top and provided on the exterior with a plurality of axially parallel capillary grooves 43 (FIGURE 4). A total of 169 capillary grooves will be provided for an external diameter of 14.5 mm. and an internal diameter of 12.5 mm. As can be clearly seen from FIGURE 4, drawn to an enlarged scale in the ratio 10:1, the capillary grooves are directly cut into the pipe wall and are of rectangular cross-section. The depth of the capillaries amounts to 0.4 mm., the width of 0.15 mm.; the pitch is selected at 0.25 mm., that is to say the thickness of the capillary ribs amounts to 0.1 mm.

The capillary pipe contains several charges of different kinds. A differentiation is made between six zones A to F. The zone A (of 150 mm. length) contains a body of reflector material, for example BeO, the zone B (of 300 mm. length) contains the actual fuel 44 (for example UC, highly enriched), the zone C (of 50 mm. length) contains a body 45, also of reflector material (BeO, possibly also UC-LrC, non-enriched), the zone D contains a filler body 46 of structure material, for example Nb-Zr, the zone E contains a body 47 of thermally insulating material and the zone F contains the automatically operated pipe closure 48. A spacer plate or disc 44a is inserted between the fuel rod 44 and the reflector 45.

The fuel element 44 is provided with a protective sheath 49 of Nb-Zr having an external diameter of 12.3 mm. and an internal diameter of 11.5 mm. A gap 50 of 0.1 mm. thickness is left between the sheath and the capillary tube, the gap being filled with the helium gas mentioned heretofore. The fuel material is UC or UC-ZrC.

The pipe zone D extends upwardly from the lower cover plate 47a and the thermal insulating layer 47b over the bottom plate 11 (of Nb-Zr; Ta; W- or Mo-alloy), the condensate collecting and distributing gap 6 and the capillary insert 12. The insert consists either of porous material or of a structure formed from thin wires.

Functional capillary zones a, b, c on the exterior of the pipe correspond to the filling zones A to F of the capillary pipe. It should be noted that the capillaries do not extend over the entire length of the pipe but only as far as the bottom plate 11. At this position and at the lower edge of the bottom plate the capillary pipes are welded to the plate. An annular capillary gap is left in the zone around the capillary structure around the capillary pipes.

The capillary zone (a) corresponds to the filling zone A as regards its position and extent. Since the upper reflector cover is disposed in this zone, evaporation in the capillaries concerned is only very slight. The zone (a) therefore acts as liquid reservoir in the event of danger of drying of the capillaries in the evaporator zone. The capillary zone (b) represents the actual evaporating section, see also the arrows drawn on the left of the pipe, the arrows in solid lines representing the liquid, for example Li, while the broken lines represent the vapor phase. It corresponds with the filling zone B, in which the nuclear fuel element is disposed.

Finally, the capillary zone (c) is constructed as the suction part of the capillary pipe, see also the horizontal arrows of the coolant flow drawn on the left of the pipe. The aforementioned zone also has only a low evaporation rate. The different pipe filling results in a self-regulating effect of the capillary supply, either from above or from below. In its totality, the active part of the reactor core is surrounded on all sides by reflector material.

Each capillary pipe has a height of approximately 60 cm., measured from the bottom plate. The distance between the bottom plate to the automatically operated closure 48 is 15 cm. Of the total height of the capillary pipe, a length of 15 cm. corresponds to the suction part (that is to say 10 cm. for the capillary insert 12 including in distributor gap while 5 cm. are taken up by the reflector body 45), a further 30 cm. are taken up by the evaporator part (that is to say the fuel element) and 15 cm. are taken up by the storage part (that is to say the upper reflector body). At the upper end the capillary pipes are connected to each other by means of grid-shaped braces 43a.

In the capillary pipe variation shown in FIGURE 5 it can be seen that the capillary pipe wall may be provided with a porous layer 51 of metal sponge, such as W, instead of grooves, the sponge being kept at a distance in space from the smooth capillary pipe 53a by means of longitudinal wires 52, thus forming the capillary space 53. The metal sponge layer is appropriately constructed to a thickness of 0.3 mm. or more and the wire is constructed to a thickness of 0.1 mm. or more.

The capillary pipes of the breeder zone are constructed and filled in a similar manner to the capillary pipes of the fission zone. They have 340 capillary grooves of the shape heretofore described, given an external diameter of 28 mm. The breeder material is $UO_2$.

Figure 6:
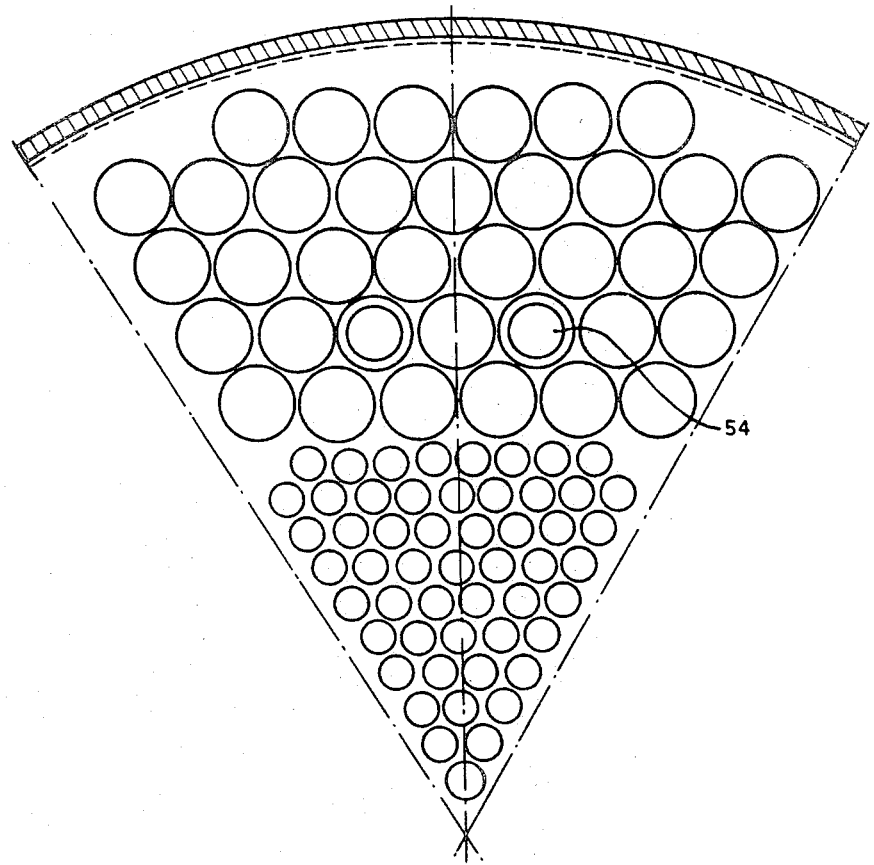
Figure 7:
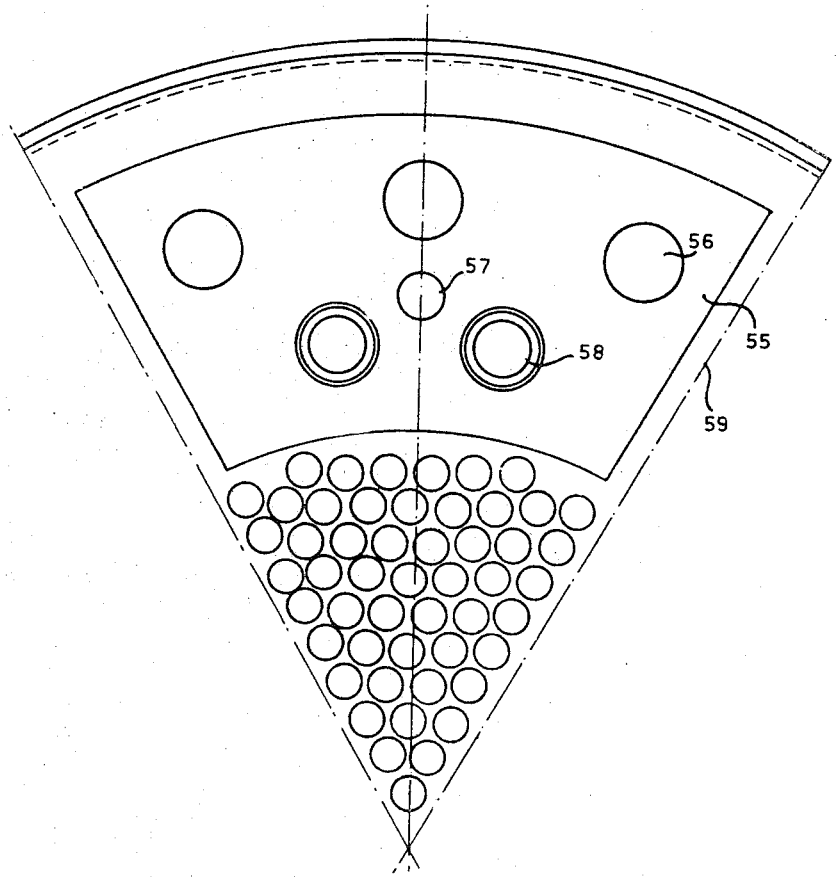

The horizontal section through a part of the reactor core according to FIGURE 6 shows the distribution and grouping of the capillary pipes of the fission zone and of the breeder jacket. Three pipes each are disposed at the corners of an equilateral triangle. The pipe spacing amounts to 16.5 mm. in the fission zone, the center distance in the breeder zone amounting to 32 mm. The items 54, which are double ringed, represent pipes for receiving the control rods. A grid of the form shown in FIGURE 7 is proposed for reactors in space vehicles. With the fission zone unchanged, the breeder jacket is replaced by a multi-section reflector, that is to say a reflector consisting of several blocks 55 of sector shape having a metallic sheath. The blocks have ducts 56 provided on the interior with longitudinal capillaries for cooling purposes, ducts 57 for accommodating mounting members and ducts 58 for accommodating control rod pipes. The lateral boundary walls of the blocks also have axially parallel capillaries for reflector cooling.

If the charging machine is omitted, the grid elements shown will no longer be the capillary pipes but will represent the grid elements themselves. They are built into the reactor vessel without extending through it. In consequence, the sheaths of the aforementioned grid elements themselves are provided with capillaries, disposed on the exterior for fuel elements and control rod pipes, and disposed on the exterior and in the bores for the reflector blocks.

The reactor grid according to FIGURE 6 as well as the grid according to FIGURE 7 is provided with a sector grouping of the elements in relation to the grid axis. A total of six groups are formed these groups leaving free six radially extending gaps 59. At the bottom of the grid the gaps form irrigation troughs which ensure the uniform supply of the capillary insert with lithium condensate.

The control rod cooling will be described in detail hereinafter with reference to FIGURES 8 and 9.

The absorber rod 61 moves freely in the pipe 62 which is provided with longitudinal capillaries. Between these two members is the gap 63 which is filled with helium for the purpose of heat dissipation. The lower end of the pipe 62 is constructed and mounted in the same way as the fuel pipe.

If the reflector is constructed in accordance with FIGURE 7, the absorber cooling pipe will be surrounded by a second concentrically disposed and internally finned pipe 64, leaving a vapor gap, as shown in FIGURE 8. The pipe 64 in turn represents a reflector boundary. The capillaries of the aforementioned pipe 64 serve to cool the reflector. The suction part 65 is shorter than in the other elements. It is connected to the structure 12 by capillary means.

The numerals 66 and 67 refer to cuts in the lower or upper reflector cover plate.

FIGURE 9 represents a part of the section along the line VII—VII in FIGURE 8.

The reactor described heretofore can be modified in numerous different ways. For example the thermal transfer chambers may have a flared cross-section, to form cooling fin structures of the kind provided for the cooling fins of an internal combustion engine. The cooling gas will then flow to the fins tangentially or frontally.

Furthermore, a conical or cup-shaped collecting plate, whose opening faces upwards, may be provided above the reactor core to prevent condensate which drips down from reaching the reactor core. Since the plate is disposed in the vapor stream, the condensate collected by it will once again be evaporated. The plate may have a capillary structure on that side which faces away from the core.

In the embodiment of the reactor described heretofore the reactor vessel is enclosed on all sides, is provided on the interior wall wholly or partially with capillaries which extend downwards from above and is connected directly as heat exchanger. The nuclear fuel elements and where applicable the moderator and reflector elements of the reactor core as well as the control and regulating rods are provided on their exterior either wholly or partially with capillaries extending downwards from above. The capillaries are connected with a capillary structure in the lower part of the reactor vessel or/and they are immersed in a quantity of condensate at the bottom of the vessel.

The basic construction and operation of the reactor variation next to be described hereinafter corresponds to the reactor concept described above. However, a difference exists in that the capillary output is increased and the flow resistances of condensate and vapor in the reactor core are reduced by special measures and that furthermore provision is made for converting the heat radiated by the reactor vessel into electrical energy for the purpose of supplying internal requirements for operation in a space vehicle. According to the invention the reactor is characterized by subdivision of the reactor core (in terms of cooling) at right-angles to the core axis into two separate halves and by a corresponding mirror image symmetrical construction of the reactor vessel to both sides of the parting joint, the capillary condensate supply structure being inserted into the joint so that the coolant acts separately on the core halves.

If therefore the transmissible power density in a one-piece core is limited because it is not possible to deliver through the capillaries more than a certain limited quantity per unit of time of condensate due to pressure drop, the subdivision of the core into two halves will halve the capillary length with the consequence that the limiting quantity relating to this length is considerably increased. This means that the power density in the entire reactor core can be correspondingly increased. A substantially improved fuel and plant utilization will therefore result.

Figure 10:
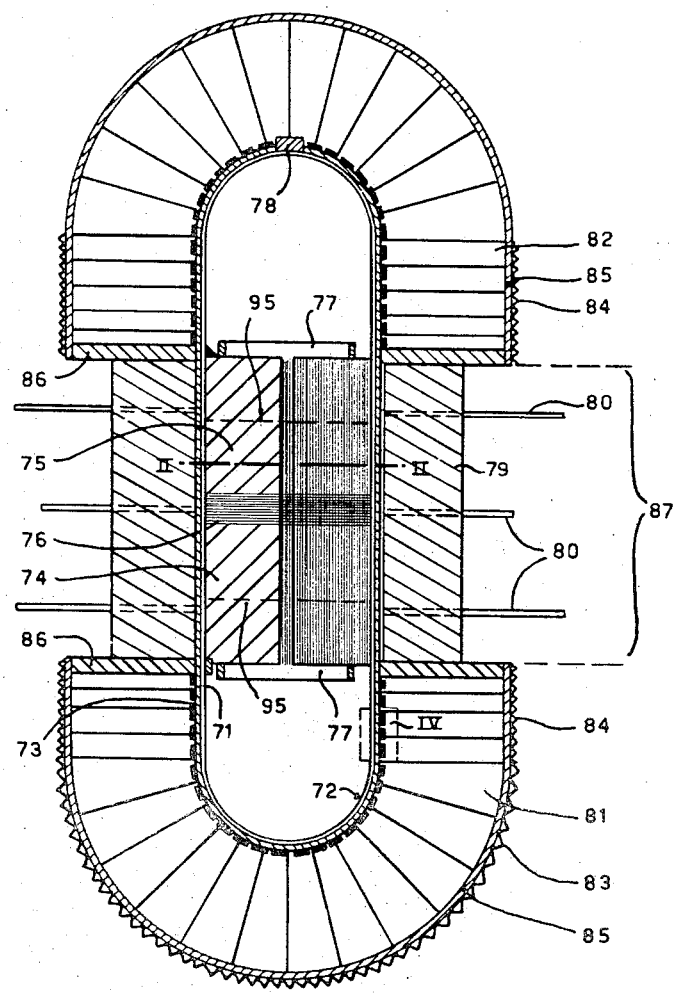
FIGURE 10 is a longitudinal section through the reactor constructed as a thermionic converter reactor and showing its retaining structure for a space vehicle.

In FIGURE 10 the numeral 71 refers to a reactor vessel constructed from a Ta alloy, the numeral 72 refers to the capillaries on the internal wall of the vessel, the numeral 73 refers to thermionic converters on the external wall of the vessel, the numeral 74 to one half of the reactor core, the numeral 76 refers to the capillary condensate supply structure in the gap between the halves of the core, the numeral 77 to the rings for retaining and bunching together the elements of the entire core, the numeral 78 refers to a plug which is welded to the reactor vessel after the operating pressure is adjusted, the numeral 79 refers to the external reactor reflector, the numeral 80 refers to the heat pipes for reflector cooling, the numerals 81, 82 refer to chambers disposed in an annular pattern around the condensation part of each half of the vessel, the said chambers being operated as heat pipes and serving for heat dissipation and the numerals 83, 84 referring to radiation fins, designed for the amount of heat to be dissipated.

The end surfaces of the thermal transfer chambers 85 represent hemispherical shells and the free edges of the chambers are welded to the retaining plates 86. The internal edges of these plates are welded to the reactor vessel to produce an integral construction. The external reflector is also mounted with both end faces on the retaining plates.

For the sake of simplicity, the regulating elements of the reactor are not shown. The reactor may be regulated by adjustment of the reflector which would have to be subdivided for this purpose into blocks which are movably disposed on the retaining plates.

The broken lines 87 drawn in the reactor core refer to the contours of a structure by which the reactor may be mounted on a space vehicle. The structure therefore engages in the reflector zone with the two retaining plates 86 mentioned heretofore.

Figure 11:
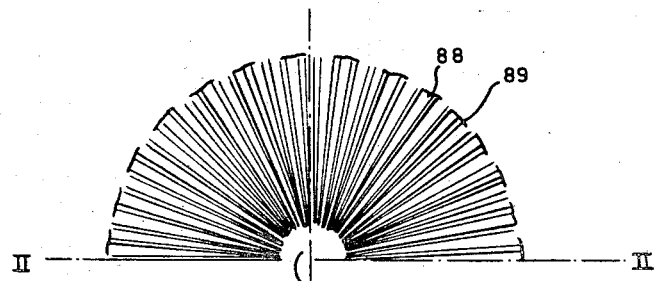
FIGURE 11 is a horizontal section through the reactor core along the line VIII—VIII of FIGURE 10.

As shown more clearly in FIGURE 11, each half of the reactor core is built up from sector-shaped fuel elements 88, between which the radial gaps 89 are left free as vapor spaces. The above-mentioned retaining rings 77 locate the elements so that they are kept at a mutual spacing. A cylindrical space 90 is left free in the center of the reactor core. This space could accommodate a safety rod. However, together with the concentration of absorbing material in the core center it also equalizes the horizontal neutron flux distribution, which is a desirable feature.

Figure 12:
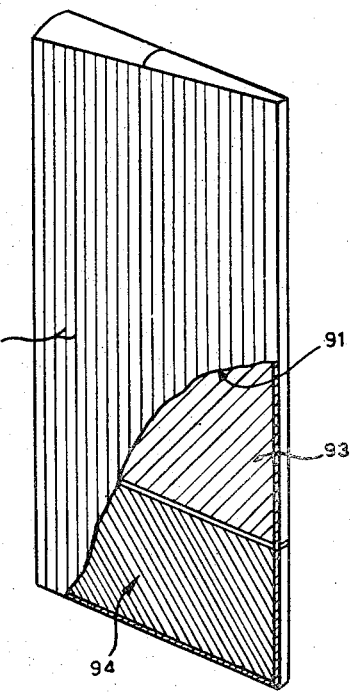
FIGURE 12 is a perspective view of a single nuclear fuel element.

The fuel elements according to FIGURE 12 consists of a closed sheath 91 of a tantalum alloy with longitudinal grooves 92 as capillaries and with two filler pieces, the nuclear fuel 93 and the reflector insert 94. The last-mentioned reflector insert together with the external reflector form a closed reflector jacket; see also the broken lines 95 in FIGURE 10.

The subdivision of the reactor core into two halves may be achieved by the insertion halfway of fuel elements, of the overall length of the core, into the capillary structure 76 provided with appropriate openings, or by two cores with their elements having a length of half the overall core height being adapted by pre-fabrication to the capillary structure. The core is retained in the reactor vessel by anchoring which extends from the vessel wall and engages on the retainers 77, the anchoring being not shown for the sake of clarity. In all cases it is essential to ensure that the core can expand freely towards one end face. The capillary structure consists of superjacently stacked screens of alloyed tantalum and extends to the wall of the reactor vessel. The capillary structure divides the reactor vessel into two symmetrical halves. The diameter of the active core zone is approximately 30 cm. and the height is approximately 34 cm. The core comprises 72 elements. Enriched UC-ZrC is employed as the nuclear fuel; lead is employed as the thermal transfer fluid; the operating pressure varies between 100 torr and 1 atm. abs. The operating temperature varies between 1400 and 1740° C.

Lithium acts as the thermal transfer liquid in the thermal transfer chambers; the operating temperature is approximately 1000° C., the operating pressure being approximately 100 torr. The chambers are made of NbZr.

As initially mentioned, the internal electrical requirements of the reactor and the space vehicle are to be obtained by means of thermionic converters which are mounted on the external condensation surfaces of the reactor vessel. A thermal flux density of 45 to 55 w./cm.$^2$ is assumed for the converters. If the reactor configuration shown in FIGURE 10 is designed for approximately 400 kw.$_{th}$, which is based on the numerical data specified heretofore, the converter will supply a total power of approximately 30 to 60 kw.$_{el}$.

According to FIGURE 13, the converters consists of sector-shaped emitter layers 96 of rhenium and the corresponding collector segments 97 consists of NbZr. Both electrodes are electrically insulated by the insulating layers 98, 99 with respect to the reactor vessel 71 and the wall of the thermal transfer chambers 81. The electrode spacing (approximately 0.5 mm.) is maintained by spacers. The converters are in electrical series connection.

Finally, FIGURE 14 shows the manner in which a reactor core of the construction illustrated in FIGURE 12, space is obtained for the control rods if these are to be disposed within the vessel zone. For this purpose, the spacers 60 in the reactor core are left free. The zone ringed by the line 68 represents the fuel zone, the surrounding zone forming the reflector jacket.

I claim:
1. A nuclear reactor with evaporization cooling comprising a gas tight, substantially vertically mounted container having a closed cylindrical lower end and a hemispherical upper end, a plurality of capillaries formed on the inner wall of said container, a nuclear core mounted in the bottom end of said container, a means external of said container for cooling the upper end thereof, a coolant medium at least partially filling said container, said coolant being evaporated in the region of said core and being condensed in the hemispherical upper end to return to the lower end by action of said capillaries.

2. A nuclear reactor according to claim 1 in which the bottom end of said container contains a plurality of thimble-shaped pockets, the opening ends of which are downwardly directed to receive fuel elements and control rods from the outside of the container.

3. A nuclear reactor according to claim 1 in which said capillaries extend from the apex of said hemispherical upper end down to the bottom end of said container.

4. A nuclear reactor according to claim 2 in which the surface of the pockets on the inside of the container are covered with vertically directed capillaries.

5. A nuclear reactor according to claim 1 comprising a cup-shaped, downwardly converging collecting plate placed in a vapor space above the core and inside the container.

6. A nuclear reactor according to claim 5 in which said collecting plate has capillaries formed on the side facing away from said core.

7. A nuclear reactor according to claim 1 in which a plurality of heat pipes are mounted on the outside of the hemispherical shell.

8. A nuclear reactor having evaporation cooling comprising a substantially cylindrical gas tight container having an externally cooled hemispherical shell at each extremity thereof, capillaries covering substantially all the inner surface of said container, and a nuclear core mounted substantially in the center of said container being at least partially filled with a liquid coolant medium which is evaporated in the region of said core, condenses in said shells, and returns by action of said capillaries to said region of the core.

References Cited

UNITED STATES PATENTS

| | | | |
|---|---|---|---|
| 3,229,759 | 1/1966 | Grover | 165—105 |
| 3,231,474 | 1/1966 | Jones et al. | 176—54 |
| 3,305,005 | 2/1967 | Grover et al. | 165—105 |

FOREIGN PATENTS

| | | |
|---|---|---|
| 1,265,483 | 5/1961 | France. |
| 785,886 | 11/1957 | Great Britain. |
| 835,266 | 5/1960 | Great Britain. |

CARL D. QUARFORTH, *Primary Examiner.*

H. E. BEHREND, *Assistant Examiner.*